W. ARNOLD.
VEHICLE WHEEL.
APPLICATION FILED MAR. 3, 1910.

1,037,847.

Patented Sept. 10, 1912.

Witnesses:

William Arnold,
Inventor
By his Attorney A. M. Pierce

UNITED STATES PATENT OFFICE.

WILLIAM ARNOLD, OF NEW YORK, N. Y.

VEHICLE-WHEEL.

1,037,847.  Specification of Letters Patent.  Patented Sept. 10, 1912.

Application filed March 3, 1910. Serial No. 547,036.

*To all whom it may concern:*

Be it known that I, WILLIAM ARNOLD, a citizen of the United States, residing at New York, in the county of New York and State of New York, have invented certain new and useful Improvements in Vehicle-Wheels, of which the following is a specification, reference being had therein to the accompanying drawing.

My invention relates to the construction and arrangement of vehicle wheels, particularly such as are used on automobiles, and has for its object the provision of a strong serviceable wheel which may be readily assembled, taken apart, or repaired, without the necessity of employing skilled labor of any kind.

To attain the desired end, my invention consists in certain novel and useful combinations or arrangements of parts and peculiarities of construction and operation, all of which will be hereinafter first fully described, and then pointed out in the claims.

Figure 1:
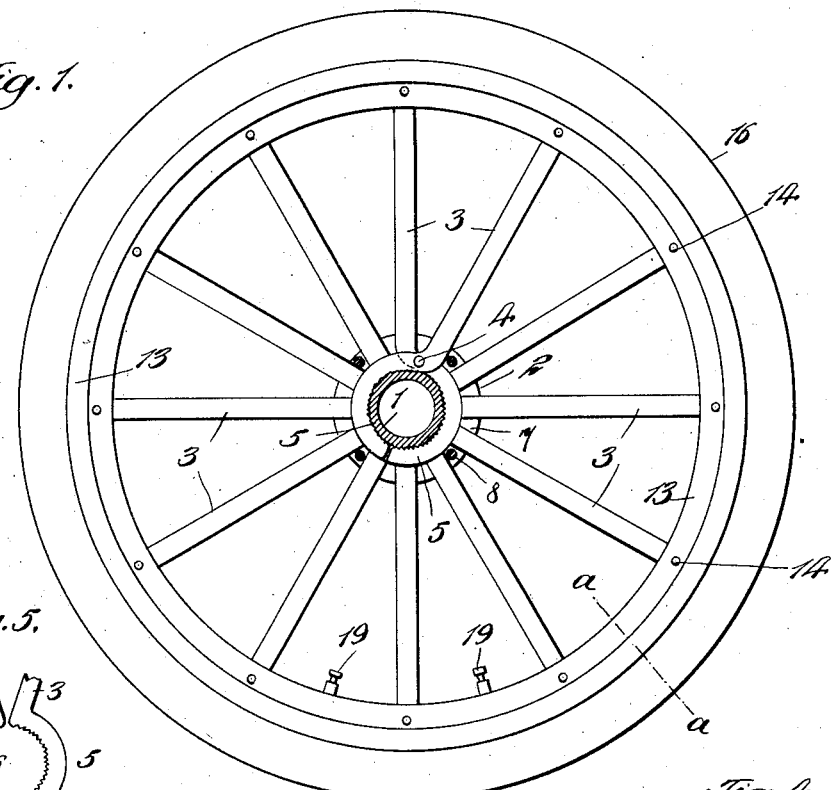
Figure 5:
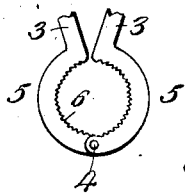
Figure 2:
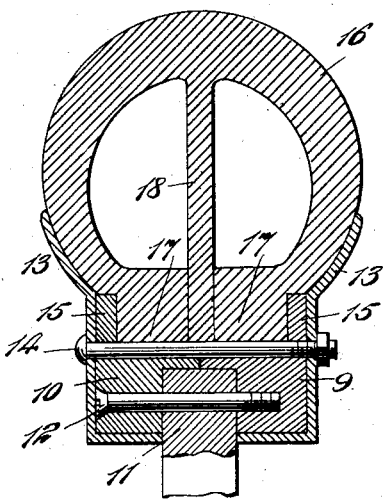
Figure 3:
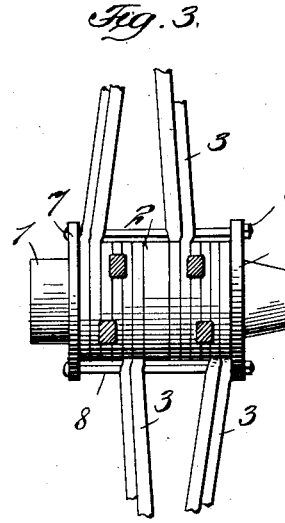
Figure 4:
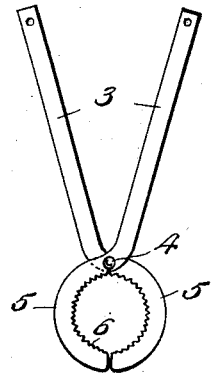

In the drawing, Figure 1 is a side elevation of a vehicle wheel embodying my invention. Fig. 2 is a cross-sectional view through the tire, felly and spoke as shown in Fig. 1; Fig. 3 is a view, partly in section, of the hub and spokes. Fig. 4 is a side elevation of a pair of the spokes removed from the hub. Fig. 5 shows a modified form of pivoting the spokes together.

Similar numerals of reference, wherever they occur, indicate corresponding parts in all the figures.

1 is the wheel hub, having a circumferential flange 2 thereon.

3 are spokes, each pair whereof are pivoted together, as at 4, and have semi-circular portions 5 arranged to embrace the wheel hub. The inner faces of the portions 5 may be corrugated or roughened, as at 6 in order to insure a proper grip upon the hub. When the spokes are in position upon the hub, they are held against any longitudinal movement thereon by plates 7, connected together by bolts 8 passing between the spokes.

9 and 10 are the two portions of the divided felly, provided with slots 11 for the reception of the outer ends of the spokes.

12 are screws which secure the spokes in place and also connect the two portions of the felly.

13 are supporting flanges for a tire, secured to the felly by bolts 14, or the equivalent.

15 are flanges at each edge of the felly.

16 is a rubber tire having lips 17 and a tongue 18 which extends from the interior of the tread of the tire between the lips 17, as particularly shown in Fig. 2 of the drawing.

19 are valves in the two parts of the tire by which they are independently inflated.

In assembling the wheel, the spokes are placed in position upon the hub, and then their outer ends are sprung into the slots in one of the portions of the divided felly. The tire is now placed in position, and then the other portion of the rim and the screws 12 are inserted, drawing the two parts of the felly together, securing the spokes, and at the same time firmly compressing the lips 17 and free end of the tongue 18 of the tire, making the two chambers therein perfectly air tight. The flanges 13 are placed in position and held by the bolts 14, providing additional means for insuring the proper holding of the tire in place.

If one side of the tire should be punctured, the other side will have sufficient sustaining power to permit the use of the vehicle. Should any of the spokes be broken, the wheel is easily taken apart and new spokes put in place, and this can be done by any person of ordinary intelligence.

Having now fully described my invention, what I claim as new therein and desire to secure by Letters Patent, is:

1. In a vehicle wheel, spokes having semicircular portions adapted to embrace a hub, each pair of spokes being pivoted or hinged together, substantially as shown and described.

2. In a vehicle wheel, a hub, spokes having semicircular portions adapted to embrace the hub, each pair of spokes being pivoted or hinged together and a felly divided circumferentially and having slots in the meeting faces of each portion for the reception of spokes.

In testimony whereof I hereto affix my signature in presence of two witnesses.

WILLIAM ARNOLD.

Witnesses:
 F. A. CHICKERING,
 A. M. PIERCE.

Copies of this patent may be obtained for five cents each, by addressing the "Commissioner of Patents, Washington, D. C."